Patented Aug. 17, 1954

2,686,708

UNITED STATES PATENT OFFICE 2,686,708

ACID TREATMENT OF SUTURES

Peter D. Plambeck, Chicago, Ill., assignor to Armour and Company, Chicago, Ill., a corporation of Illinois No Drawing. Application August 26, 1949, Serial No. 112,637

6 Claims. (Cl. 8—94.11)

This invention relates to the treatment of sutures, and more particularly sutures made from animal intestines.

Surgical ligatures are commonly made from the intestines of sheep, hogs, etc. Two general kinds of suture products are prepared. One kind, which is termed "boilable" is marketed in a moisture-free storing fluid and may be reboiled in this fluid before use. The other kind is termed "nonboilable" and is stored in a fluid such as ethyl or isopropyl alcohol or mixtures thereof, containing various concentrations of moisture. The "nonboilable" type of product does not allow further boiling, due to the collagen-breakdown by moist heat.

In the preparation of these two types of products the sutures are packed in glass tubes and are subjected to a rigorous sterilization treatment. The heat sterilization is done at temperatures of the order of 320° F. for an hour or more. The influence of the sterilization conditions is extremely severe in a product of collagenous nature, such as "catgut" sutures, and in many cases is the cause for the poor quality of the final product.

The collagen suture to be heat-sterilized must be dried so as to be free of moisture to prevent gelatinization. A change from collagen to gelatine by heat-hydrolysis will destroy the product completely, rendering it useless. After a suture is successfully sterilized it will be very stiff and brittle and somewhat horny. In this state the suture is not fit to be used in surgery. If the suture is prepared as "boilable," the "catgut-string" will have to be moistened in wet, sterile towels to obtain the desired pliability. If the suture is prepared as "nonboilable," a storing fluid containing an amount of moisture is added. The purpose of this moisture is to reinstate the desired pliability to the sterilized suture.

If the suture is not thoroughly dry prior to sterilization, the sterilized suture will be extremely brittle and an excess amount of moisture is required to produce the desired pliability. Adding such an excess of moisture will cause undue swelling of the string resulting in a too large a diameter in proportion to the tensile and knot strength.

An object of this invention is to provide a method of treating sutures so that subsequent heat treatment will not destroy the desirable characteristics such as strength, pliability, and smoothness of the product. A further object is to treat sutures formed from animal intestines in such a manner as to change its collagen molecule and thereby increase the bound-water content thereof increasing also the transparency and smoothness of the product while also giving it a slight tackiness which inhibits any sliding of the individual collagen fibers and allows the knot to set very firmly. A further object is to produce a suture structure from animal intestines which retains its pliability when removed from the storing fluid and which has less tendency to swell when in a storing liquid. Other specific objects and advantages will appear as the specification proceeds.

As an illustrative example of my process, the following may be set out:

After the gut of sheep, hogs, etc., is split into segments and mechanically cleaned, it is subjected to a chemical cleaning process for about a week. The latter process consists of immersing the gut-segments into alkaline solutions such as those of sodium or potassium carbonates, etc. After the cleaning process, the gut-segments may be spun into strands of various diameters, and after the spinning operation I prefer to keep the spun gut in running water for purposes of washing out excess salt deposits. The washing step may sometimes require as much as twenty-four hours.

The process is particularly effective in the treatment of sheep intestines and is applied to the submucous layer of sheep intestines. The sheep intestines are composed of the mucous layer, submucous layer, muscular layer, and peritoneal layer. In the practice of the present process, the mucous as well as muscular and peritoneal layers are removed, leaving the submucous layer only for treatment. This layer is washed as above described, then acid treated, dried, and subjected to sterilizing temperatures, as will be described now in greater detail.

After the washing step, the gut is subjected to acid treatment and the amounts and concentrations of the acid solutions to be used is governed by the amount of suture strings to be treated. Since each individual suture string, in the above illustration, is composed of various plies, the total ply feet to be treated will usually determine the amounts of solutions to be used. For example, I have obtained excellent results by applying 10 cc. of a solution of approximately N/4 sulfuric acid per ply foot. Similar solutions in the strength of N/6 to N have also given satisfactory results. Ordinarily the effect of acid solutions below N/6 strength gives greatly diminished results while solutions stronger than N, though usable, tend to increase the reaction too far.

Instead of sulfuric acid, I find that other mineral acids, such as hydrochloric or phosphoric acids, etc., can also be employed.

The choice and effects of acids in their reaction with the collagen suture material is governed by the Hofmeister law, i. e., the sulfate ion is more reactive than the chlorine ion; the chlorine ion is more reactive than the phosphate ion, etc. I have found that best results are obtained when an inorganic acid providing sulphate, chloride or phosphate ions is employed.

The amount of solutions used per ply foot may also be changed and in general smaller amounts of more concentrated solutions or larger amounts of weaker solutions are required.

A treatment of from two to five hours in the acid bath solution is ordinarily found to be sufficient, the time being determined by the strength of the acid solution used. A shorter time is required for stronger solutions and longer times for weaker solutions.

Following the acid treatment, the gut is washed in cold running water usually for a period of from eight to fifteen hours, and after this time it may be placed upon drying frames.

If the gut is to be prepared as a special type of gut, as for example, a chromed suture, I prefer to employ the acid treatment after the chroming process. If there is any other special treatment, I prefer to carry it out prior to the acid-treating step. Better results are obtained when the acid treatment is the last step, other than washing, before the gut is hung for drying.

The time of treatment with the acid should desirably be sufficient to bring about a change in the collagen molecules of the suture and with the acids of the strength described above, such results are achieved from within two to seven hours. For example, the application of mild acid solutions (concentration less than 0.10% $H_2SO_4$) in certain proportions to the amount of product gives very satisfactory results in about three hours' treating time, particularly where the acid-treating step has been followed by an overnight washing in water.

The above described acid treatment produces a change in the structure of the collagen-molecule so that it is able to retain its desired suture characteristics even after the severe heat treatment required for sterilization. I believe that the collagen under a reaction with weak concentrations of acids forms collagen salts with these acids. This alteration of the collagen produces a greater tolerance toward severe dry heat. Further, treatment with mild acid solutions seems to establish a partial jel structure system increasing the desired characteristics of the product.

After the sutures have been dried they may be sterilized by any of the well known sterilizing procedures. Suitably the sutures may be placed in glass tubes containing a hydrocarbon fluid and heated to sterilizing temperatures (about 320° F.) while in this fluid or the vapors thereof. The sterilized sutures are packaged and marketed in tubes containing an appropriate storing fluid. Specific procedures for sterilization are given in Bradshaw Patent 2,197,717 and Josh Patent 2,405,216.

A suture which in its preparation has been treated in the mild acid solution as described, shows certain desirable characteristics which are absent in sutures not treated with acid solutions. Such characteristics are:

(1) The acid-treated suture is very pliable and retains this pliability for hours after being out of the storing fluid. Untreated sutures will lose their pliability and become stiff and dry under the same circumstances within a half hour.

(2) The acid-treated suture shows a high degree of transparency and smoothness, readily allowing the detection of any flaws in the suture string. Untreated sutures are lacking this transparency.

(3) The acid-treated suture has a certain tackiness which allows the knot to set very firmly, inhibiting the knot-slippage to a greater extent than in untreated sutures.

(4) The acid-treated suture will swell considerably less in diameter if put into a "nonboilable" storing fluid. This feature allows the production of a suture strand of rather small diameter with greater tensile and knot strength.

I believe in sutures treated with mild acid solutions a partial jel structure system is established. Evidence of such a system can be found in the following facts:

(1) The pliability of the treated suture is retained in that the moisture of the storing solution is firmly held in this colloidal system contrary to untreated sutures where the moisture is only loosely bound and evaporates readily.

(2) This firmly bound moisture is also the cause for greater transparency of the suture string. This bound moisture furthermore acts as a lubricant in the machine polishing of sutures with sandpaper. The lubricating action prevents damage of the suture string by heat friction and allows a smoother polish than formerly possible.

(3) The tackiness produced by the acid-treatment is brought about by a definite change in the structure of the collagen molecule due to mild acid hydrolysis. This tackiness inhibits a sliding of the individual collagen fibers and allows the knot to set very firmly.

While in the foregoing specification, I have set out specific details of the process as illustrative of one mode in which it may be practiced, it will be understood that such details may be modified widely by those skilled in the art without departing from the spirit of my invention.

I claim:

1. In the treatment of a natural collagenous surgical suture obtained from the intestines of animals, the steps consisting of soaking said suture in an N/6 to 1 N aqueous solution of an acid selected from the group consisting of sulphuric, hydrochloric, and phosphoric acid for a time period of from 2 to 7 hours with the time period approaching 2 hours as the normality approaches 1 N and the time period approaching 7 hours as the normality approaches N/6 to increase the bound water content of the suture without at the same time tanning the suture and without degrading the same, and thereafter heat-sterilizing the acid-treated suture.

2. The process of steps of claim 1 wherein said acid is sulphuric acid.

3. The process steps of claim 1 wherein said acid is hydrochloric acid.

4. The process steps of claim 1 wherein said acid is phosphoric acid.

5. The process steps of claim 1 in which said suture is formed from the submucous layer of sheep intestines.

6. In the treatment of a natural collagenous surgical suture formed from animal intestine wherein said suture is to be heat sterilized, the steps of soaking said suture in an N/6 to 1 N aqueous solution of an acid selected from the group consisting of sulphuric, hydrochloric, and phosphoric acid for a time period of from 2 to 7 hours with the time period approaching 2 hours as the normality approaches 1 N and the time period approaching 7 hours as the normality approaches N/6 to increase the bound water content of the suture without at the same time tanning the suture and without degrading the suture, washing said suture to remove acid solution adhering thereto, drying said suture, and thereafter heat sterilizing said suture.

References Cited in the file of this patent

UNITED STATES PATENTS

| Number | Name | Date |
|---|---|---|
| 221,199 | Turner et al. | Nov. 4, 1879 |
| 691,505 | Turner | Jan. 21, 1902 |
| 1,231,911 | Kimata | July 3, 1917 |
| 1,281,466 | Wise et al. | Oct. 15, 1918 |
| 1,476,740 | Uyama | Dec. 11, 1923 |
| 1,758,564 | Ehrenreich | May 13, 1936 |
| 2,039,262 | Schulte | Apr. 28, 1936 |
| 2,167,251 | Rogers | July 25, 1939 |
| 2,196,238 | Werby | Apr. 9, 1940 |
| 2,240,388 | Calva | Apr. 29, 1941 |
| 2,374,201 | Highberger | Apr. 24, 1945 |

FOREIGN PATENTS

| Number | Country | Date |
|---|---|---|
| 508,142 | Germany | Sept. 24, 1930 |

OTHER REFERENCES

Hand Book of Ligatures and Sutures, published in 1931 (third ed.), by Johnson and Johnson, New Brunswick, N. J.

"Progress in Leather Science 1920–1945," British Leather Manufacturer's Research Assn., London 1948, page 81.

Lightband—Abstract of Canadian Patent No. 119,989 of 1909.